United States Patent [19]

Kataoka

[11] Patent Number: 5,107,604
[45] Date of Patent: Apr. 28, 1992

[54] SHREDDING AND FLUIDIZATION DRYING APPARATUS

[75] Inventor: Fukutaro Kataoka, Kawasaki, Japan

[73] Assignee: Ryoma Kakoki Co., Ltd., Tokyo, Japan

[21] Appl. No.: 414,957

[22] Filed: Sep. 29, 1989

[30] Foreign Application Priority Data

Jul. 19, 1989 [JP] Japan .................. 1-186644

[51] Int. Cl.⁵ .............................................. F26B 17/00
[52] U.S. Cl. .................................. 34/57 R; 34/57 A; 34/90; 34/85
[58] Field of Search .................. 34/17, 60, 10, 57 A, 34/57 B, 57 R, 85, 90

[56] References Cited

FOREIGN PATENT DOCUMENTS 9228 1/1985 Japan .
291822 3/1986 Japan .
215812 5/1924 United Kingdom .............. 34/57 A Primary Examiner—Henry A. Bennett
Attorney, Agent, or Firm—Ladas & Parry

[57] ABSTRACT

A shredding and fluidization drying apparatus for treating a material such as waste paper of industrial waste generally comprises a vertical fluidization drying column, a separator for separating a dried material and a gas component fed from the fluidization drying column, a paddle mixer mixing a new material with a part of the dried material from the separator, a conveyor for feeding the mixed material into the fluidization drying column, and a hot blast supplying means for supplying a hot blast into the fluidization drying column. A pair of rotary drum assemblies, each comprising a pair of rotary drum units provided with blade members and combined suitably, are disposed at the lower portion of the fluidization drying column and the rotary drum assemblies are supported by a pair of parallel shafts to be rotatable respectively. One of the rotary drum assemblies are positioned on a hot blast supplying side and provided with a space at a central portion of the rotary drum assemblies through which the hot blast is blown and the other one of the rotary drum assemblies is positioned on a material feeding side in the fluidization drying column and provided with spaces between both ends thereof and the side wall of the fluidization drying column.

18 Claims, 2 Drawing Sheets

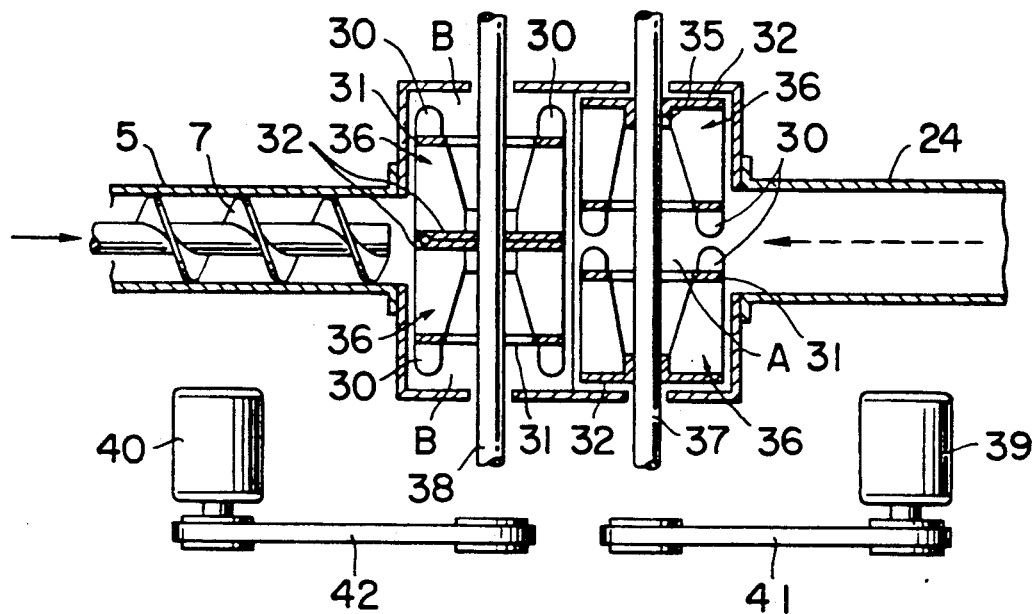
FIG. 3
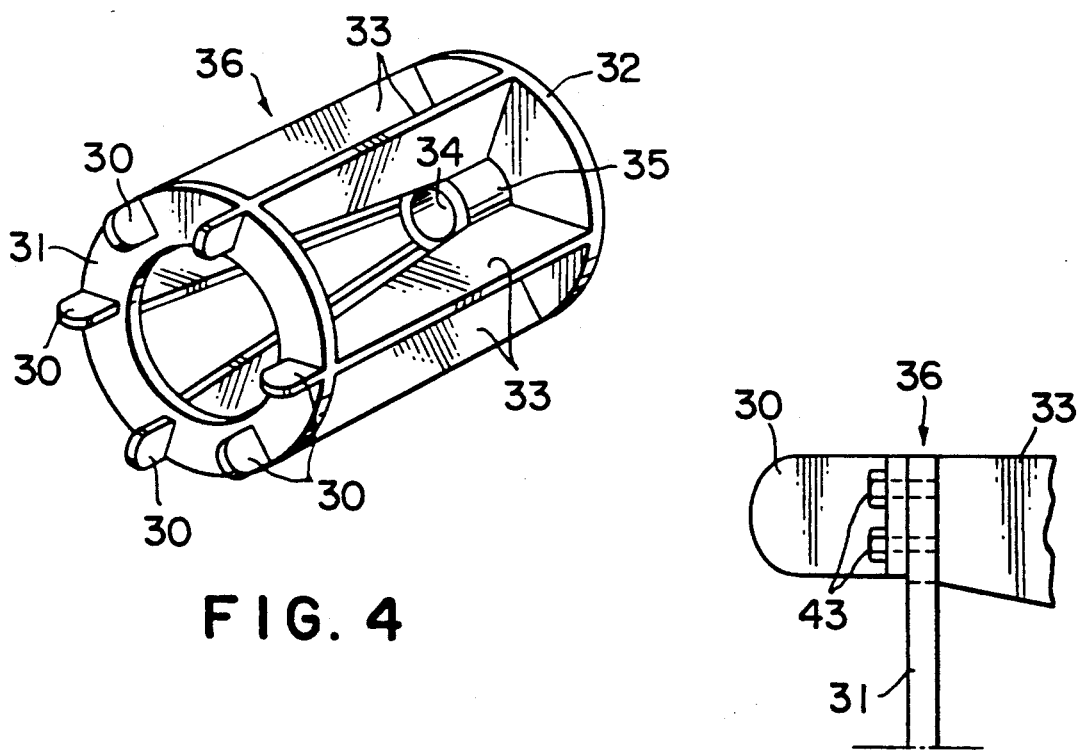
FIG. 4
FIG. 5

SHREDDING AND FLUIDIZATION DRYING APPARATUS

BACKGROUND OF THE INVENTION

This invention relates to a shredding and fluidization drying apparatus and, more particularly, to an apparatus for shredding a material such as waste paper or industrial waste in rotary drum assemblies and then fluidization drying the shredded material in a drying column with a hot blast upwardly fluidizing the material.

Many kinds of shredding and drying machines, including a fluidization drying apparatus, are known for shredding a material for recycling such as waste paper or industrial waste into fine particles or pieces and the shredded material with hot blast blown into a drying column.

With the drying apparatus of the type described above, the material introduced into the apparatus is liable to adhere to a material feeding portion or nearby because of the water content or viscosity of the material before the material is subjected to the drying treatment. The outer surface of the thus adhered and piled material may be burned when it comes in contact with a hot gas utilized as a heating medium for the drying treatment and, in a case where such adverse phenomenon has been continued for a long time, the burned material generates odors or, in an adverse case, the material may ignite and explode.

In the other case where the material introduced is in the form of cake or mixture of various kinds of components having densities different from each other, the components having heavy densities may be piled on the bottom of the drying column of the drying apparatus and the piled components will prevent the sufficient and stable feeding and circulation of the hot gas for drying the material.

Taking the above technical matters into consideration, the inventor of this application conceived a shredding and drying apparatus such as disclosed in the Japanese Patent Publication No. 60-9228 or Japanese Patent Laid-open Publication No. 61-291822. The shredding and drying apparatus disclosed includes a fluidization drying column or tower in which a pair of rotary drums provided with blade members are disposed for shredding a material and sucking hot gas for drying the material in a lower portion of the drying column. At the drying operation, the rotary drum is rotated to shred the components or parts of the material which are not upwardly fluidized with the ascending current in the drying column to effectively bring the material into contact with the hot gas as a heating source with the rotary drums rotating to evaporate the water content in the material and reduce the density thereof, whereby the shredded undried material can be easily dried in a short time and materials having components changed by the heat can also be effectively treated.

With the drying apparatus disclosed in the prior art publication, the hot blast is fed into one of the rotary drums at the axially central portion thereof and blown out through both the axial end openings. The hot blast blown from one of the rotary drums is induced into the other one of the rotary drums disposed with the material feeding side and the hot blast and the material sucked in the other rotary drum is then blasted upwardly from the axially central portion thereof. It may be desired to arrange the rotary drums so that the upwardly blasted material is effectively fluidized by the hot blast blown through both the ends of the rotary drum.

In order to achieve the functions or effects described above, according to the conventional technology, the rotary drum on the hot blast blowing side is provided with no blade member at the axially central portion of the rotary drum and the rotary drum on the material feeding side has a reduced length. According to this construction, however, the fed material is liable to stay in the space of the drying column by the hot blast blown from both the ends of the rotary drum and, in addition the material is liable to fall and accumulate in the space at both ends of the rotary drum on the material feeding side. These adverse phenomena prevent the effective fluidization of the material in the drying column and hinder the effective shredding or crushing of the fluidizing materials due to the mutual collision thereof during fluidization.

In another view point, in a case where the material to be treated includes foreign materials or components which cannot be shredded or crushed, for example, metallic parts or materials such as bolts or nuts, or stone or rock, these foreign materials will collide with the blades of the rotary drum and be sent flying. The foreign materials will then fall because of the heavy weight and again collide with the blade members. These phenomena will be repeated and a large noise due to the collision between the blade members and the foreign materials will be generated. In an adverse case, the blade members of the rotary drum may be damaged by the foreign materials intruded into the space between the rotary drum and the lower portion of the drying column or the rotary drum may itself be stopped. In such adverse cases, it is required to stop the operation of the drying apparatus and to remove the foreign materials. However, when the operation of the drying column is once stopped, all the material fluidizing therein falls due to its own weight and may be piled on the rotary drum. It is further troublesome for the operator to find and remove the foreign materials from the material piled on the rotary drum.

SUMMARY OF THE INVENTION

An object of this invention is to substantially eliminate the defects or drawbacks encountered in the prior art described hereinabove, and to provide a shredding and fluidization drying apparatus capable of effectively shredding a material to be treated and fluidization drying the same without piling the material in a treating apparatus and effectively and easily removing the foreign matter contained in the material.

Another object of this invention is to provide a shredding and fluidization drying apparatus including a treating device in which rotary drum assemblies provided with improved structures are disposed for finely shredding the material due to the colliding function.

These and other objects can be achieved according to this invention by providing a shredding and fluidization drying apparatus including a vertical fluidization drying column of the type in which a material such as waste paper or industrial waste is shredded and fluidization dried into fine powdered material, comprising:

a pair of rotary drum assemblies disposed at the lower portion of the fluidization drying column;

a pair of parallel shafts rotatably supported by the fluidization drying column, the shafts supporting the rotary drum assembly to be rotatable respectively;

driving mechanisms disposed externally to the fluidization drying column for driving the shafts;

a hot blast supplying means provided for the fluidization drying column for supplying a hot blast into the fluidization drying column; and a material feeding means provided for the fluidization drying column for feeding a material to be treated into the fluidization drying column;

one of the rotary drum assemblies being positioned on a hot blast supplying side of the fluidization drying column and provided with a space at a central portion thereof through which the hot blast is blown and the other one of the rotary drum assemblies being positioned on a material feeding side of the fluidization drying column and provided with spaces between both ends thereof and a side wall of the fluidization drying column.

In another aspect according to this invention, there is also provided a shredding and fluidization drying apparatus for treating a material such as waste paper or industrial waste, comprising:

a vertical fluidization drying column;

a separator operatively connected to the fluidization drying column for separating a dried material and a gas component fed from the fluidization drying column;

a paddle mixer operatively connected to the separator for mixing a new material with a part of the dried material from the separator;

a conveyor operatively connected to the paddle mixer for feeding the mixed material into the fluidization drying column;

a hot blast supplying means operatively connected to the fluidization drying column for supplying a hot blast into the fluidization column;

a pair of rotary drum assemblies disposed at the lower portion of the fluidization drying column;

a pair of parallel shafts rotatably supported by the fluidization drying column, the shafts supporting the rotary drum assemblies to be rotatable respectively; and driving mechanisms disposed externally to the fluidization drying column for driving the shafts;

one of the rotary drum assemblies being positioned on a hot blast supplying side of the fluidization drying column and provided with a space at a central portion thereof through which the hot blast is blown and the other one of the rotary drum assemblies being positioned on a material feeding side of the fluidization drying column and located with spaces between both ends thereof and the side wall of the fluidization drying column.

According to the construction of the shredding and fluidization drying apparatus of this invention, the hot blast is blasted from the hot blast supplying means into the space defined in the axial central portion of the rotary drum assemblies located on the hot blast supplying side in the fluidization drying column and forcibly blasted upwardly from both ends of the rotary drum assemblies. The material fed from the material feeding means into the fluidization drying column falls on the rotary drum assemblies disposed on the material feeding side in the fluidization drying column and then is fluidized upwardly with the ascending current of the hot blast. During these processes, the components of the material mutually collide and are thereby shredded or crushed into fine components and the water content contained in the material vaporized to. The heavy components falling downwardly on the rotary drum assemblies are shredded or crushed into fine components by the blade members of the rotary drum assemblies which are then moved upwardly in the fluidization drying column. The thus dried material is discharged from the upper portion of the fluidization drying column into the separator together with the gas component. The materials gathered in the separator are separated on the basis of the natures of the materials and fed to the various portions for the following treatment. The materials in the spaces between the rotary drum assemblies are also scattered or splashed by the vanes provided for the rotary drum assemblies and then moved upwardly with the ascending current of the hot blast into the fluidization drying column. The foreign materials such as metallic parts, stones or the like which cannot be shredded by the blade members of the rotary drum assemblies fall on the bottom of the fluidization drying column and are recovered in the recovery box by opening the bottom plates of the drying column.

BRIEF DESCRIPTION OF THE DRAWINGS

FIG. 3 is a cross sectional view taken along the line III—III in FIG. 2;

FIG. 4 is a perspective view showing a rotary drum unit provided with blade members constituting a rotary drum assembly of the apparatus shown in FIG. 1; and FIG. 5 is a side view of one example of a vane to be secured to the rotary drum unit shown in FIG. 4.

DESCRIPTION OF THE PREFERRED EMBODIMENTS

Figure 1:
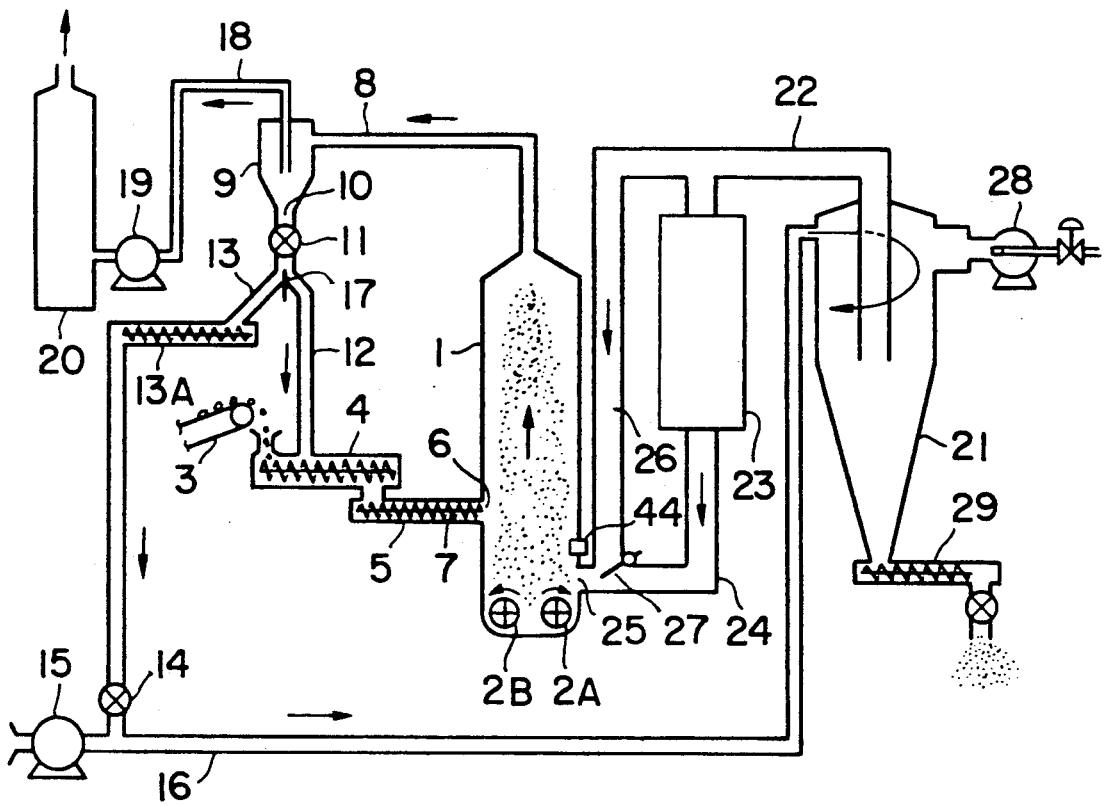
FIG. 1 shows a diagrammatic view showing the entire arrangement of a shredding and fluidization drying apparatus according to this invention.

Referring to FIG. 1 a material shredding and fluidization drying apparatus according to this invention includes a sealed fluidization drying column or tower 1 of the vertical type. A bilateral pair of rotary drum assemblies 2A and 2B are disposed at a lower bottom portion in the fluidization drying column 1, the former 2A being disposed on a hot gas blasting side and the latter 2B being disposed on a material feeding side as described in detail hereinafter. A material feeding port 6 is opened to a side wall of the lower portion of the drying column 1 at a portion above the location of the rotary drum assembly 2B on the material feeding side. To the material feeding port 6 is connected one end portion of a material feeding conveyor 5 for conveying the material from a paddle mixer 4 connected to the upstream end portion of the conveyor 5. The material to be treated by the shredding and fluidization drying apparatus is supplied to the paddle mixer 4 through a material supplying conveyor 3. The paddle mixer 4 operates to mix the material including high water content and the powdered material once dried in the fluidization drying column 1 to reduce the apparent water content and to preliminarily form a plate-like or massive material, which is then shredded into particles or pieces so as to be fluidized in the drying column 1. The material conveyed from the paddle mixer 4 to the material feeding conveyor 5 is fed into the fluidization drying column 1 by the predetermined amount by locating a screw means 7 to the conveyor 5.

The upper portion of the vertical fluidization drying column 1 is operatively connected to an upper portion of a separator 9 in the form of a cyclone through a duct 8 so as to communicate the interior of the drying column 1 with the interior of the separator 9. The separator 9 is also of a vertical type and is provided with a discharge port 10 at the lower portion thereof. The discharge port 10 is connected to branch pipes 12 and 13 through a rotary valve 11. One branch pipe 12 is connected to the paddle mixer 4 so that the material once dried in the fluidization drying column 1 is fed to the paddle mixer through the separator 9 and the branch pipe 12 as described hereinafter. The other branch pipe 13 is operatively connected to a conveying duct 16 through a conveyor 13A and a rotary valve 14. The conveying duct 16 is connected at one end to a blower 15 for feeding air and combustion air. A damper 17 is also located at a branched portion of the branch pipes 12 and 13 for regulating the feeding amount of the dried material in the form of powders.

One end of a duct 18 for outwardly discharging an exhaust gas conveying the dried powders in the fluidization drying column 1 is inserted into the separator 9 through the upper wall thereof and the other end of the duct 18 is connected to a dust collector 20 through a blower 19.

The other end of the conveying duct 16 is connected in the tangential direction to the upper portion of an incinerator 21 in the form of a vertical cyclone serving to separate an ash component. One end of a duct 22 is inserted into the incinerator 21 through the upper wall thereof and the other end of the duct 22 is connected to a heat exchanger 23 or a waste heat recovery boiler A duct 24 connected to a discharge portion of the heat exchanger 23 is connected to a hot gas blasting port 25 formed in the side wall of the fluidization drying column 1 at a portion directly above the location of the rotary drum assembly 2A on the hot gas blasting side. To the duct 24 is connected a duct 26 bypassing the heat exchanger 23. A damper 27 for regulating the amount of heat required for drying the material in the drying column 1 is arranged at the connecting portion of the ducts 24 and 26. A start-up combustion equipment 28 is operatively connected to the upper portion of the incinerator 21 and an ash discharging conveyor 29 is connected to the bottom portion of the incinerator 21 as shown in FIG. 1.

Referring to FIG. 3, the rotary drum assembly 2A disposed on the hot gas blasting side is provided with a hot blast inducing space A at the axial central portion thereof and a plurality of scattering or splashing vanes 30, 30, each extending towards the space A. The rotary drum assembly 2B disposed on the material feeding side is provided with spaces B and B defined between both the ends of the rotary drum assembly and the inner wall surface of the fluidization drying column 1 and also provided with a plurality of scattering or splashing vanes 30, 30, ... each extending towards the spaces B and B.

FIG. 4 represents one preferred embodiment of a rotary drum unit 36 constituting the rotary drum assembly 2A or 2B. The rotary drum unit 36 comprises a ring shaped end plate 31 constituting the hot blast sucking side, a disc end plate 32, a plurality of, six in the illustrated embodiment, blade members each in the shape of a plate 33, 33, ... extending in the axial direction of the unit 36 between both the end plates 31 and 32 so that the width of each of the blades 33 gradually decreases towards the ring shaped end plate 31, a plurality of (six in the illustrated embodiment) scattering vanes 30, 30, ... disposed on the outer peripheral surface of the ring shaped end plate 31 so as to extend axially outwardly each in shape of a spoon, and a boss 35 provided with an axial bore 34 and disposed inside the disc end plate 32.

The rotary drum assembly 2A on the hot gas blasting side includes, as shown in FIG. 3, two rotary drum units 36 mounted on a shaft 37 through the axial bores of the bosses 35 and 35 so that the scattering vanes 30 and 30 of the respective rotary drum units 36 and 36 are opposed to each other and the bosses 35 and 35 are secured to the shaft 37 by means of bolts, for example, to define a space A between the opposing ring shaped end plates 31 and 31 of the respective rotary drum units 36 and 36.

The rotary drum assembly 2B on the material feeding side includes, also as shown in FIG. 3, two rotary vane units 36 and 36 so that the disc end plates 32 and 32 of the respective units 36 and 36 are tightly engaged and axially aligned so as to be supported by a shaft 38 inserted through the axial bores of the bosses 35 and 35. The bosses 35 and 35 are secured to the shaft 38 by means of bolts, for example, to define spaces B and B between the scattering vanes 30 and 30 of the ring shaped end plates 31 and 31 and the inner wall surface of the fluidization drying column 1.

Figure 2:
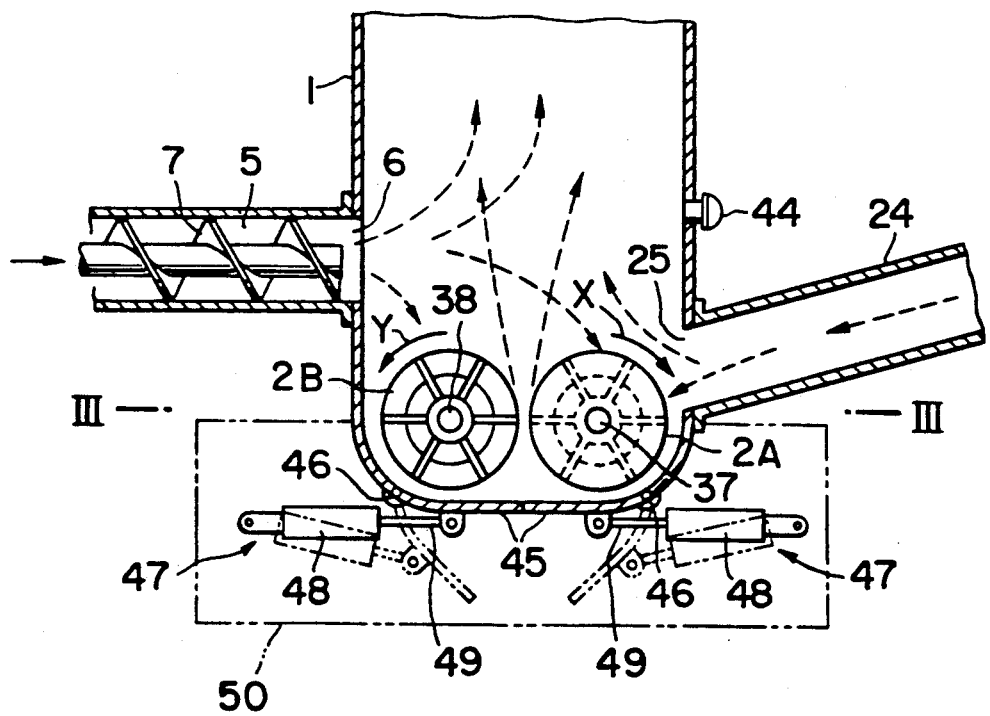
FIG. 2 is a vertical sectional view, partially broken, of a lower portion of a fluidization drying column of the apparatus shown in FIG. 1.

Referring to FIG. 3, the shafts 37 and 38 of the rotary drum assemblies 2A and 2B are operatively connected to electric motors 39 and 40 directly or indirectly through V-belts 41 and 42, respectively, for example, so as to rotate the respective rotary drum assemblies in directions arrowed by letters X and Y in FIG. 2. It will be desired that each of the rotary drum units is rotated at a rotating speed of about 1500 r.p.m., and more specifically, about 1000 r.p.m. in case of utilizing a rotary drum unit having a diameter of about 600 mm, or about 3000 r.p.m. in the case of utilizing a rotary drum unit having a diameter of about 300 mm.

Although, in the embodiment shown in FIG. 4, the scattering vanes 30 are formed integrally with the ring shaped end plate 31, the scattering or splashing vanes 30 may be formed independently of the end plate 31 as shown in FIG. 5, in which the scattering vanes 30 can be secured to the end plate 31 by means of bolts 43 or the like. According to this modification, various kinds of scattering vanes each having an axial length different from each other can be attached in accordance with the sizes or properties of the materials to be treated. Moreover, the scattering vanes may be easily secured to the ring shaped end plate 31 by bolt means 43 at intermediate portions between the attaching portions of the adjacent blades 33 and 33. In a further preferred modification, axially slidable scattering vanes 30 may be secured to the end plate 31 so that the axial length thereof can be adjusted.

As best illustrated in FIG. 2, a sound detector 44 may be located on the side wall of the fluidization drying column 1 at a portion near the rotary drum assemblies 2A and 2B to detect the sound generated by colliding the foreign materials against the blades 33, and transmit a detection signal as an alarm signal at a time when the colliding sound exceeds a predetermined level.

The bottom portion of the fluidization drying column and closed. The bottom plates 45 and 45 are positioned directly below the rotary drum assemblies 2A 2B, respectively, and the base ends of the bottom plates 45 and 45 are pivotally secured to the lowermost portions of the fluidization drying column 1 so as to occupy the opened positions as shown by dotted lines in FIG. 2. The bottom plates 45 and 45 constitute a flat bottom portion of the drying column 1 when closed.

The bottom plates 45 and 45 can be actuated by driving mechanisms 47 and 47 both located downwardly externally of the fluidization drying column 1. In the embodiment illustrated in FIG. 2, each of the driving mechanisms 47 and 47 comprises a pneumatic cylinder assembly 48 having a base end pivotally secured to a stationary side. The pneumatic cylinder assemblies 48 and 48 are actuated so that rod members 49 and 49 of the respective pneumatic cylinder assemblies 48 and 48 are contracted to open the bottom plates 45 and 45 and expanded to close the same. The actuation of the pneumatic cylinder assemblies 48 and 48 is performed in response to the signal transmitted from the sound detector 44 at a time when the detector detects the colliding sound at the predetermined level. The existence of the foreign materials may be detected by detecting the overload applied to the driving mechanism for the rotary drum assemblies 2A and 2B. Hydraulic cylinder assemblies or a combined mechanism of motors and crank members may be utilized instead of the pneumatic cylinder assemblies. The foreign material is recovered by a sealed recovery box 50 disposed below the bottom plates 45 and 45, which are accommodated in the box 50.

The shredding and fluidization drying apparatus of the construction described hereinbefore according to this invention will be operated in the following manner.

The shredding and fluidization drying apparatus generally operates as a whole in a manner that undried material is continuously fed to the paddle mixer 4 from the conveyor 3 and the material having a high water content is mixed therein with a dried material powder to reduce the apparent water content. The plate-like or massive material is shredded into a fluidizable state in the pre-treatment. The material is then fed to the conveyor 5. The material is fed into the central portions of the rotary drum assemblies 2A and 2B disposed in the fluidization drying column 1 from the feeding end of the conveyor 5 by way of the material feeding port 6 formed in the wall of the drying column 1 at a portion above the location of the rotary drum assembly.

The greatest portion of the materials fed into the fluidization column 1 is upwardly fluidized by the ascending current blasted therein during the time when the materials collide with each other and are shredded and the water content thereof is vaporized. The foreign materials each having a heavy weight included in the fed materials fall by their own weight and are sucked on the suction side, i.e. on the side of the ring shaped end plate 31, by the blades 33 and 33 of the rotary drum assemblies 2A and 2B. The heavy materials collide with the blades 33 and the inner surface of the bottom portion of the drying column 1 to thereby be finally shredded or crushed into dried powders which are then moved upwardly. The material moved upwardly in the fluidization drying column 1 is moved into the cyclone separator 9 together with the gas component in which the gas component and the dried powder materials are separated. The separated dried materials are fed through the rotary valve 11 to the damper 17 by which the dried materials are further separated. One portion of the separated materials is again fed through the branch pipe 16 to the paddle mixer 4 in which the dried materials are mixed with the new material including a high water content. The other part of the dried material powder is conveyed to the incinerator 21 to be burnt through the branch pipe 13, the rotary valve 14, and the conveying duct 16 by means of the blower 15. The gas component separated in the cyclone separator 9 is conveyed into the dust collector 20 through a duct by means of the discharge blower 19 and is then discharged into the atmosphere after dust removal treatment.

During the shredding and fluidization drying operation described above, the material introduced into the fluidization drying column 1 repeatedly collides with the blades 33 and 33 of the rotary drum assemblies 2A and 2B and is finally shredded or crushed into fine powders. The locations of the spaces A and B in the rotary drum assemblies 2A and 2B may facilitate the accumulation of the material at the lower portions of the spaces, but the material in the spaces are scooped by the scattering or splashing vanes each in the form of a spoon and agitated thereby, whereby the material shredding or crushing effect can be further improved and promoted. Accordingly, substantially all the material can be upwardly moved by the ascending current in the fluidization drying column 1 and effectively dried.

As described above, since the material is not piled in the spaces of the rotary drum assemblies 2A and 2B disposed at the lower portion of the fluidization drying column 1, the burning or firing of the piled material can be effectively obviated.

In a case where the material includes foreign material such as metallic parts, stone or rock, colliding noises are generated by the collision between the blades 33 and 33 of the rotary drum assemblies 2A and 2B and the inner wall of the fluidization drying column 1. The colliding noises are detected by the sound detector 44, which then transmits noise detecting signals into the driving mechanism 47 and 47 for opening and closing the bottom plates 45 and 45 of the fluidization drying column 1. In response to the noise detecting signals, the pneumatic cylinder assemblies 48 and 48 of the driving mechanisms 47 and 47 are contracted to open the bottom plates 45 and 45 to recover the foreign material into the recovery box 50 disposed below the fluidization drying column 1. Since the upper surfaces of the bottom plates 45 and 45 are made flat, the foreign material can be gathered in a space in the lower portion between the rotary drum assemblies 2A and 2B, whereby the foreign material can be surely recovered by opening the bottom plates 45 and 45. The inner space of the fluidization drying column is maintained under a negative pressure, for example, of about 300 mmAg and the inner pressure is lowered when the bottom plates 45 and 45 are opened, but the foreign material recovery box 50 is of a sealed structure, so that an influence due to the opening of the bottom plates is not substantially caused.

The foreign material recovery box 50 may be provided with the bottom structure capable of being opened and closed as a double damper structure. In such arrangement, a conveyor is arranged below the recovery box 50 to automatically convey the foreign material out of the apparatus.

It is to be noted that this invention is not limited to the embodiments described herein and many other changes and modifications may be made as far as they are within the scopes or spirits of this invention defined in the appended claims.

What is claimed is:

1. A shredding and fluidizing drying apparatus comprising:

a vertical fluidization drying column having generally opposite sides with generally opposite side walls therebetween;

a pair of rotary drum assemblies inside the fluidization drying column at a lower portion thereof;

a pair of parallel shafts rotatably supported by the fluidization drying column and respectively supporting the rotary drum assemblies;

driving means disposed externally to the fluidization drying column for rotatably driving the shafts;

hot-blast means for supplying a hot blast into the fluidization drying column at one of the opposite sides thereof;

feeding means for feeding a material into the fluidization drying column at the opposite one of the opposite sides thereof;

one of the rotary drum assemblies being positioned on the one hot-blast supplying side of the fluidization drying column and provided with a space at a central portion thereof through which the hot blast is blown and the other of the rotary drum assemblies being positioned on the opposite material-feeding side of the fluidization drying column and provided with spaces respectively between opposite ends thereof and the side walls of the fluidization drying column; and each of the rotary drum assemblies comprising a pair of rotary drum units each provided with a ring-shaped end plate and a disc-shaped end plate, a plurality of blade members extending between said end plates along an axial direction thereof for guiding the hot blast and shredding the material in the fluidization drying column, and plurality of vanes on an outer surface of the ring-shaped end plate so as to extend in the axial direction of the rotary drum unit thereof.

2. An apparatus according to claim 1, wherein each of said rotary drum assemblies comprising a pair of rotary drum units each provided with a ring-shaped end plate and a disc-shaped end plate, a plurality of blade members extending between said end plates along an axial direction thereof and serving to guide the hot blast and shredding the material introduced into the fluidization drying column, and a plurality of vanes secured on an outer surface of said ring-shaped end plate sc as to extend in the axial direction of the rotary drum unit.

3. An apparatus according to claim 1, wherein said one of rotary drum assemblies on the hot blast supplying side comprises two rotary drum units which are mounted on one of said shafts so that said vanes on said ring-shaped end plates of the rotary drum units oppose each other across a space and said other one of rotary drum assemblies on the material feeding side comprises two rotary drum units which are mounted on the other one of said shafts so that said disc-shaped end plates of the rotary drum units are in tight contact with each other.

4. An apparatus according to claim 1, wherein said vanes mounted on said ring-shaped end plate of the rotary drum unit are disposed at positions of said ring-shaped end plate corresponding to positions to which one ends of said blade members are secured.

5. An apparatus according to claim 1, wherein said vanes mounted on said ring-shaped end plate of the rotary drum unit are disposed at positions of said ring-shaped end plate intermediate of positions to which one end of said blade members are secured.

6. An apparatus according to claim 5, wherein said vanes are detachably secured to said ring-shaped end plate by means of bolts.

7. An apparatus according to claim 6, wherein said vanes are constructed to be extensible in the axial direction thereof.

8. An apparatus according to claim 1, wherein each of said vanes is in the form of a spoon.

9. An apparatus according to claim 1, wherein said means for supplying the hot blast is a port formed in the side wall of the fluidization drying column at a portion above the location of said one of the rotary drum assemblies.

10. An apparatus according to claim 1, wherein said means for feeding the material is a port formed in the side wall of the fluidization drying column at a portion above the location of said other one of the rotary drum assemblies.

11. An apparatus according to claim 1, wherein said rotary drum assemblies are located above a bottom wall of said fluidization drying column with a space.

12. An apparatus according to claim 11, wherein said bottom wall comprises a pair of bottom plates to be downwardly openable by a driving mechanism disposed externally of said fluidization drying column.

13. An apparatus according to claim 12, wherein said bottom plates are provided with upper surfaces which are aligned flush with each other when closed.

14. An apparatus according to claim 12, wherein said driving mechanism is a pneumatic cylinder assembly provided with a contractable rod member connected to each said bottom plate.

15. An apparatus according to claim 12, further comprising a sound detector mounted on the side wall of said fluidization drying column at a lower portion thereof for detecting noises in the fluidization drying column.

16. An apparatus according to claim 15, wherein said sound detector is operatively connected to said driving mechanism for opening said bottom plates of said fluidization drying column when said sound detector detects a noise of a predetermined level.

17. An apparatus according to claim 12, further comprising a recovery box attached to the lower portion of said fluidization drying column in a sealed manner so that said bottom plates are accommodated therein when said bottom plates are downwardly opened.

18. A shredding and fluidization drying apparatus, comprising:

a vertical fluidization drying column;

means operatively connected to the fluidization drying column for separating a dried material and a gas component fed from said fluidization drying column;

a paddle mixer operatively connected to the separating means for mixing a new material with a part of the dried material from said separating means;

a conveyor operatively connected to said paddle mixer for feeding the mixed material into the fluidization drying column;

means operatively connected to the fluidization drying column for supplying a hot blast into said fluidization drying column;

a pair of rotary drum assemblies disposed at the lower portion of said fluidization drying column;

a pair of parallel shafts rotatably supported by said fluidization drying column, said shaft supporting said rotary drum assemblies to be rotatable respectively; and means disposed externally of said fluidization drying column for driving said shafts;

one of said rotary drum assemblies being positioned on a hot blast supplying side in said fluidization drying column and provided with a space at a central portion thereof through which the hot blast is blown and the other one of said rotary drum assemblies being positioned on a material feeding side in said fluidization drying column and located with spaces between both ends thereof and the side wall of said fluidization drying column.

* * * * *